United States Patent
Nuhn

(10) Patent No.: US 10,710,422 B2
(45) Date of Patent: *Jul. 14, 2020

(54) AMPHIBIOUS PUMPING VEHICLE

(71) Applicant: Nuhn Industries Ltd., Sebringville (CA)

(72) Inventor: Ian Nuhn, Sebringville (CA)

(73) Assignee: Nuhn Industries Ltd., Sebringville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/157,950

(22) Filed: Oct. 11, 2018

(65) Prior Publication Data
US 2019/0039426 A1   Feb. 7, 2019

Related U.S. Application Data

(63) Continuation of application No. 15/586,493, filed on May 4, 2017, now Pat. No. 10,124,638, which is a
(Continued)

(51) Int. Cl.
*B60F 3/00* (2006.01)
*A01C 23/04* (2006.01)
(Continued)

(52) U.S. Cl.
CPC ............ *B60F 3/0061* (2013.01); *A01C 3/026* (2013.01); *A01C 23/045* (2013.01); *B60F 3/003* (2013.01);
(Continued)

(58) Field of Classification Search
CPC ...... B60F 3/0061; B60F 3/0007; B60F 3/003; B60F 3/0038; B60F 3/00
See application file for complete search history.

(56) References Cited

U.S. PATENT DOCUMENTS

| 1,943,152 A | 1/1934 | Weiss |
| 3,384,047 A | 5/1968 | Remley |

(Continued)

FOREIGN PATENT DOCUMENTS

| CA | 2002619 A1 | 5/1991 |
| DE | 2364962 A1 | 7/1975 |

(Continued)

OTHER PUBLICATIONS

International Search Report and Written Opinion, PCT/CA2014/050789, dated May 11, 2014.
Translation of Chinese Office Action dated Mar. 2, 2017 on CN 201480053275.
Translation of Chinese Office Action dated Nov. 6, 2017 on CN 201480053275.
(Continued)

*Primary Examiner* — Stephen P Avila
(74) *Attorney, Agent, or Firm* — Brunet & Co. Ltd.; Robert Brunet; Hans Koenig

(57) ABSTRACT

An amphibious pumping vehicle has a floatable vehicle body, a ground engaging propulsion structure, a fluid pump, a plurality of fluid nozzles comprising a first fluid nozzle connected by a fluid conduit to the fluid pump and at least one second fluid nozzle connected to the fluid conduit, a valve structure in the fluid conduit, the plurality of fluid nozzles and the valve structure co-operating to provide directional control and motive power for the vehicle when floating, and a power source configured to provide power to both the ground engaging propulsion structure and the fluid pump.

20 Claims, 7 Drawing Sheets

Related U.S. Application Data continuation of application No. 15/044,905, filed on Feb. 16, 2016, now Pat. No. 9,694,636, which is a continuation of application No. PCT/CA2014/050789, filed on Aug. 18, 2014.

(60) Provisional application No. 61/867,598, filed on Aug. 19, 2013.

(51) Int. Cl.
*A01C 3/02* (2006.01)
*B63H 25/02* (2006.01)
*F04D 13/02* (2006.01)

(52) U.S. Cl.
CPC .......... *B60F 3/0007* (2013.01); *B60F 3/0038* (2013.01); *B63H 25/02* (2013.01); *F04D 13/02* (2013.01); *B60F 2301/00* (2013.01); *B63H 2025/028* (2013.01)

(56) References Cited

U.S. PATENT DOCUMENTS

| | | |
|---|---|---|
| 4,406,413 A | 9/1983 | Houle |
| 4,594,006 A | 6/1986 | Depeault |
| 5,176,098 A | 1/1993 | Royle |
| 2010/0144220 A1 | 6/2010 | Bailey |
| 2013/0145980 A1 | 6/2013 | Puck |
| 2014/0112093 A1 | 4/2014 | Puck |
| 2015/0258868 A1 | 9/2015 | Visscher |

FOREIGN PATENT DOCUMENTS

| | | |
|---|---|---|
| DE | 3431345 A1 | 3/1986 |
| WO | 2008/038029 A2 | 4/2008 |

OTHER PUBLICATIONS

Office Action dated Aug. 23, 2018 on EA 201690422-31.
Office action dated Jan. 5, 2017 on U.S. Appl. No. 15/044,905.
Office action dated Aug. 23, 2017 on U.S. Appl. No. 15/586,493.
Office action dated Dec. 15, 2017 on U.S. Appl. No. 15/586,493.

AMPHIBIOUS PUMPING VEHICLE

CROSS-REFERENCE TO RELATED APPLICATIONS

This application is a continuation of U.S. patent application Ser. No. 15/586,493 filed May 4, 2017, which is a continuation of U.S. patent application Ser. No. 15/044,905 filed Feb. 16, 2016 now issued under U.S. Pat. No. 9,694,636 on Jul. 4, 2017, which is a continuation of international patent application PCT/CA2014/050789, filed Aug. 19, 2014, which claims the benefit of U.S. patent application 61/867,598 filed Aug. 19, 2013, the entire contents of which are herein incorporated by reference.

TECHNICAL FIELD

The invention relates to pumps and vehicles equipped for pumping. In particular, the invention relates to manure pumps and amphibious vehicles equipped for pumping liquid manure, such as animal manure contained in a farm lagoon.

BACKGROUND

Manure produced during animal husbandry, particularly hog and cattle manure, is transferred by washing to a pit or lagoon for storage prior to removal for land application or further processing. During storage, a crust can develop on the surface of the pit or lagoon that must be disrupted prior to or during removal of the manure. Pumps are employed for this purpose with jets that return a percentage of the manure back to the pit or lagoon in the form of a high volume spray to disrupt the crust and recirculate the manure. Pumps for use in recirculating manure from smaller pits are known; however, these pumps are typically suitable for accessing the pit or lagoon from its edge and are connected to a tractor or similar land vehicle for operational power. They are therefore limited in their ability to recirculate manure to the middle of large lagoons, which are becoming increasing common as the size of animal husbandry operations increases.

Accordingly, there is a need for improved pumps and vehicles equipped for pumping, particularly pumps and vehicles suitable for use with large manure lagoons.

SUMMARY OF THE INVENTION

According to the invention, there is provided an amphibious pumping vehicle comprising: a floatable vehicle body; ground engaging propulsion structure configured to raise and lower relative to the vehicle body; a fluid pump; a first fluid nozzle configured to direct fluid through the air, the fluid nozzle connected by a fluid conduit to the fluid pump; and, a power source configured to provide power to both the ground engaging propulsion structure and the fluid pump.

The floatable vehicle body may be in the shape of a mono-hull, a catamaran or a barge. Floatation of the vehicle body may be provided by a displacement hull, pontoon elements, or buoyant elements, for example foam filled buoyant chambers, such as are used for supporting floating docks. The vehicle body may be made using a variety of suitable materials, for example, fiberglass, aluminum, plastics, steel, etc.

The ground engaging propulsion structure may comprise ground engaging elements of the type suitable for powering a vehicle across wet or muddy terrain. For example, the ground engaging propulsion structure may comprise an endless track or a set of wheels. The set of wheels may comprise two or more wheels, for example four wheels, six wheels or eight wheels. May be provided in pairs with one wheel of each pair disposed on opposite sides of the vehicle. When the vehicle comprises a set of wheels, any number of the wheels may be driven in order to provide propulsion for the vehicle. Although at least two wheels may be driven, it is preferred that at least four wheels are driven. Although the vehicle may be provided with steering structure configured to change direction of one or more pairs of wheels, it is preferred that the wheels are independently driven at variable speeds, allowing them to be fixed in direction relative to the vehicle body. This provides directional control of the vehicle, even in wet or muddy conditions where conventional steering is likely to be ineffective due to sliding of the steerable set of wheels. A variety of drive mechanisms may be used to operate the wheels independently at variable speed; for example, at least one motor may be connected to each wheel that is hydraulically or electrically operable at variable speed. A transmission may alternatively be provided with structure configured to allow each wheel to be operated at variable speeds.

The ground engaging propulsion structure is configured to raise and lower relative to the vehicle body. Raising and lowering may be provided by telescoping structure or lever structure configured to pivot relative to the vehicle body. The lever structure may comprise a linear actuator that is driven, for example hydraulically, to cause pivoting of the lever arm relative to the vehicle body and thereby raise or lower the wheels. Each wheel is preferably raised or lowered at the same time. Alternatively, the lever structure may comprise a planetary drive that is either mechanically or hydraulically powered to cause pivoting of the lever arm.

The vehicle further comprises a power source configured to provide power to both the ground engaging propulsion structure and the fluid pump. The power source may be self-contained on the vehicle or may be linked to shore. For example, the power source may comprise an internal combustion engine, a fuel-cell, electric batteries, etc. The power source may comprise an electric motor that may be driven from shore via an electrical cable. The power source may be connected to a generator for supplying electrical power to electrical systems on board the vehicle. The power source may be connected to a hydraulic pump for supplying hydraulic fluid pressure to hydraulic systems on board the vehicle. The power source may be connected to the fluid pump hydraulically, electrically, or via a mechanical drive. A single power source may be used to provide power to all vehicle systems, including the fluid pump. In one embodiment, the power source is an internal combustion engine that is connected to the fluid pump and a hydraulic pump via a mechanical drive. The mechanical drive may comprise a gearbox to provide an appropriate rotational speed for the fluid pump. The mechanical drive may comprise a gearbox to provide an appropriate rotational speed for the hydraulic pump. The fluid pump and hydraulic pump may be operated at the same or different rotational speeds.

The fluid pump may comprise a pump housing configured for immersion within the fluid. The pump housing may comprise a bottom fluid inlet and at least two tangential fluid outlets. A greater number of tangential fluid outlets may be provided, for example three fluid outlets. The tangential fluid outlets may be combined into a single fluid conduit for directing the combined output of the fluid pump to a desired location. The vehicle may comprise structure configured to cause raising and lowering of the fluid pump, especially the fluid pump housing, relative to the vehicle body. For example, a hydraulically or electrically driven linear actuator may be provided on the vehicle and configured to raise and lower the fluid pump. This may be accomplished via a telescoping structure or a lever structure of the vehicle. The tangential fluid outlets may be equipped with flexible or telescoping connections to the single fluid conduit. Lowering the fluid pump for immersion into the fluid obviates the need for priming the fluid pump, which can be problematic when the fluid is manure comprising solid materials that can plug the pump or priming structure. Immersion of the pump also simplifies intermittent operation of the pump, due to eliminating potential loss of prime, and reduces the need for pump maintenance.

The vehicle comprises a first fluid nozzle configured to direct fluid through the air. The fluid nozzle is connected by fluid conduit to the fluid pump. The fluid conduit connecting the fluid nozzle to the fluid pump may comprise the single fluid conduit that is connected to the tangential fluid outlets of the pump. The vehicle may further comprise a plurality of fluid nozzles comprising the first fluid nozzle and at least one second fluid nozzle connected to the fluid conduit. The first fluid nozzle may comprise a front nozzle and the second fluid conduit may comprise the rear nozzle or a pair of rear nozzles. The plurality of fluid nozzles may comprise at least two side fluid nozzles on opposite sides of vehicle connected to the fluid conduit. The at least two side fluid nozzles may comprise a pair of fluid nozzles on opposite sides of the vehicle connected to the fluid conduit; thus, the at least two side fluid nozzles may comprise a total of four fluid nozzles. The vehicle may further comprise valve structure configured to proportion fluid flow between the plurality of fluid nozzles. The valve structure may comprise a valve corresponding to each fluid nozzle. The valve corresponding to each fluid nozzle may be actuatable, for example hydraulically or electrically. The valve structure may be actuatable remotely.

The plurality of fluid nozzles and the valve structure may cooperate to provide directional control, motive power, or a combination thereof for the vehicle when floating. For example, by closing valve structure associated with the fluid nozzle(s) on the right side of the vehicle, fluid flow is directed to the nozzle(s) on the left side of the vehicle, causing the vehicle to turn to the right. In one embodiment, steering is achieved solely by cooperation of the plurality of fluid nozzles and the valve structure; accordingly, the vehicle does not comprise a rudder. In one embodiment, movement of the vehicle while floating is achieved solely by cooperation of at least the second fluid nozzle and the valve structure; accordingly, the vehicle does not comprise a propeller.

One or more fluid nozzles may comprise adjustment structure that is powered and configured to adjust an angle of the fluid nozzle relative to the floatable vehicle body. For example, the first fluid nozzle may comprise first adjustment structure and the second fluid nozzle(s) may comprise second adjustment structure, each adjustment structure configured to adjust an angular orientation of its respective fluid nozzle(s) in a vertical and/or horizontal plane. In one embodiment, both the first fluid nozzle and the second fluid nozzle(s) are adjustable in a vertical plane. The second fluid nozzle(s) is/are adjustable in the vertical plane by an amount sufficient to cause forward or backward movement of the vehicle when floating. In other words, the second fluid nozzle(s) is/are adjustable to point at least partially toward the front of the vehicle at least partially toward the rear of the vehicle. The second fluid nozzle(s) may be configured to direct fluid through the air in a substantially downward direction. The first fluid nozzle may be configured to direct fluid through the air in a substantially upward direction. The side fluid nozzle(s) may be configured to direct fluid through the air in a substantially downward direction. One or more side fluid nozzle(s) may comprise adjustment structure configured to adjust an angular orientation of its respective side fluid nozzle(s) in a vertical plane.

The location of at least the ground engaging propulsion structure, the power source and the fluid pump may be selected to provide a desired location for a center of gravity of the vehicle. The desired location for the center of gravity of the vehicle may be selected to improve handling characteristics of the vehicle while floating. The center of gravity may be located along the longitudinal centerline of the vehicle. The center of gravity may be located substantially in the middle of the vehicle, for example at an intersection of longitudinal centerline of the vehicle and the transverse centerline of the vehicle. The center of gravity may be located rearward of the transverse centerline of the vehicle. The center of gravity may be located forward of the transverse centerline of the vehicle. Thus the ground engaging propulsion structure, power source, and fluid pump cooperate together to improve handling characteristics of the vehicle.

The vehicle may comprise remote control structure configured to cause the vehicle to be remotely controllable by an operator remote from the vehicle. The vehicle may be remotely controllable by an operator remote from the vehicle when the vehicle is ground engaging and when the vehicle is floating. The remote control structure may comprise a wireless transmitter and a wireless receiver. The remote control structure may be configured to control the speed and or direction of the vehicle when ground engaging and when floating. The remote control structure may be configured to control an amount of fluid flow from at least the first nozzle. The remote control structure may be configured to control an angular orientation of at least the first nozzle relative to the vehicle body. The remote control structure may be configured to control an amount of fluid flow from at least the second nozzle(s). The remote control structure may be configured to control an angular orientation of at least the second nozzle(s) relative to the vehicle body. The remote control structure may be configured to control the valve structure in order to proportion fluid flow between the plurality of fluid nozzles. The remote control structure may be configured to control rotational speed of the fluid pump. The remote control structure may be configured to raise and lower the fluid pump. The remote control structure may be configured to raise and lower the ground engaging propulsion structure. The remote control structure may be configured to start and stop the power source.

Further features of the invention will be described or will become apparent in the course of the following description.

BRIEF DESCRIPTION OF THE DRAWINGS

In order that the invention may be more clearly understood, embodiments thereof will now be described in detail by way of example, with reference to the accompanying drawings, in which.

DETAILED DESCRIPTION

Figure 1:
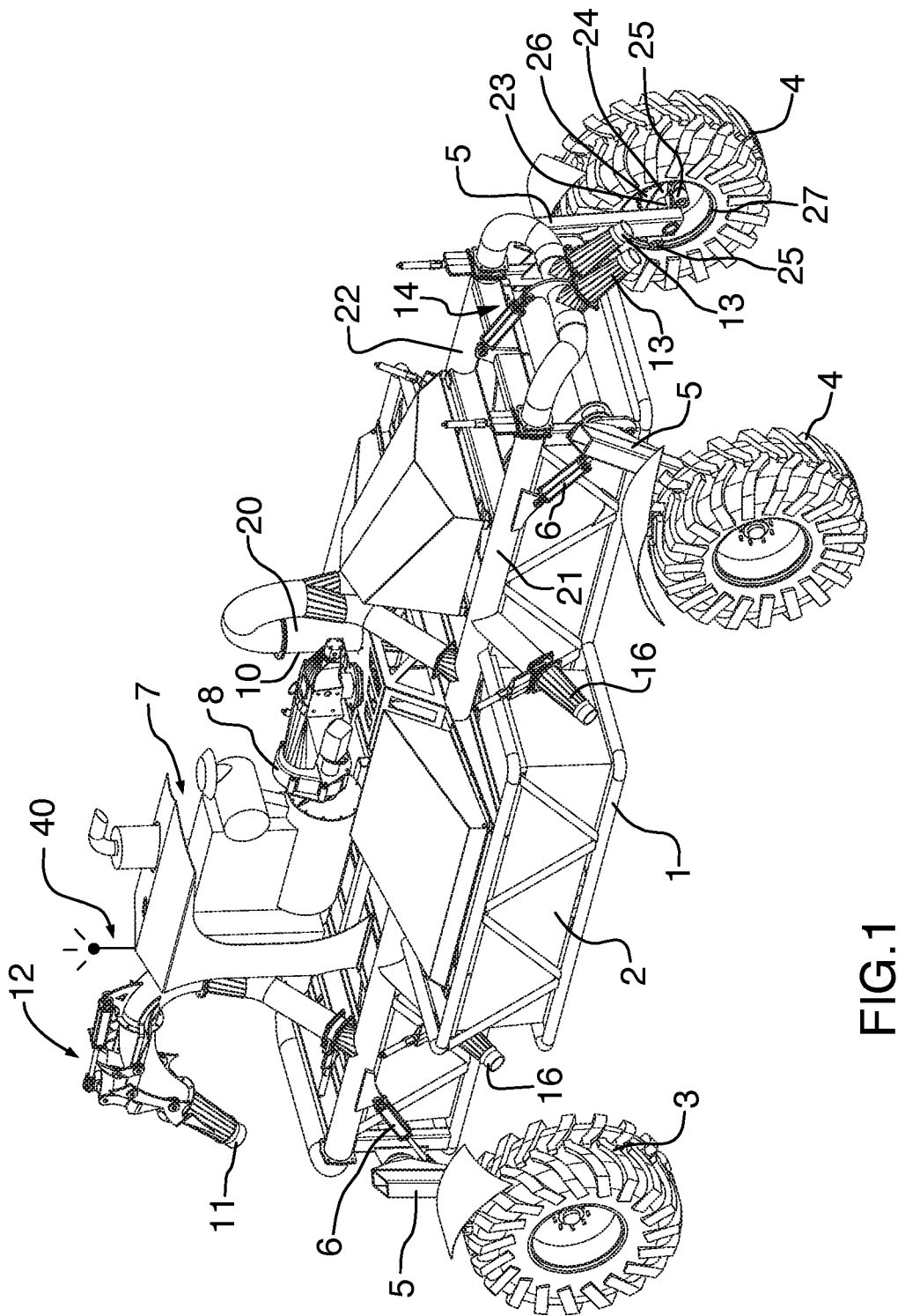
FIG. 1 shows a perspective view of an embodiment of the vehicle with wheels lowered.

In describing the figures, like features are referred to by like reference numerals. Although not all features indicated on a particular drawing are necessarily described with reference to that drawing, all of the features are described with reference to at least one of the drawings.

Figure 2:
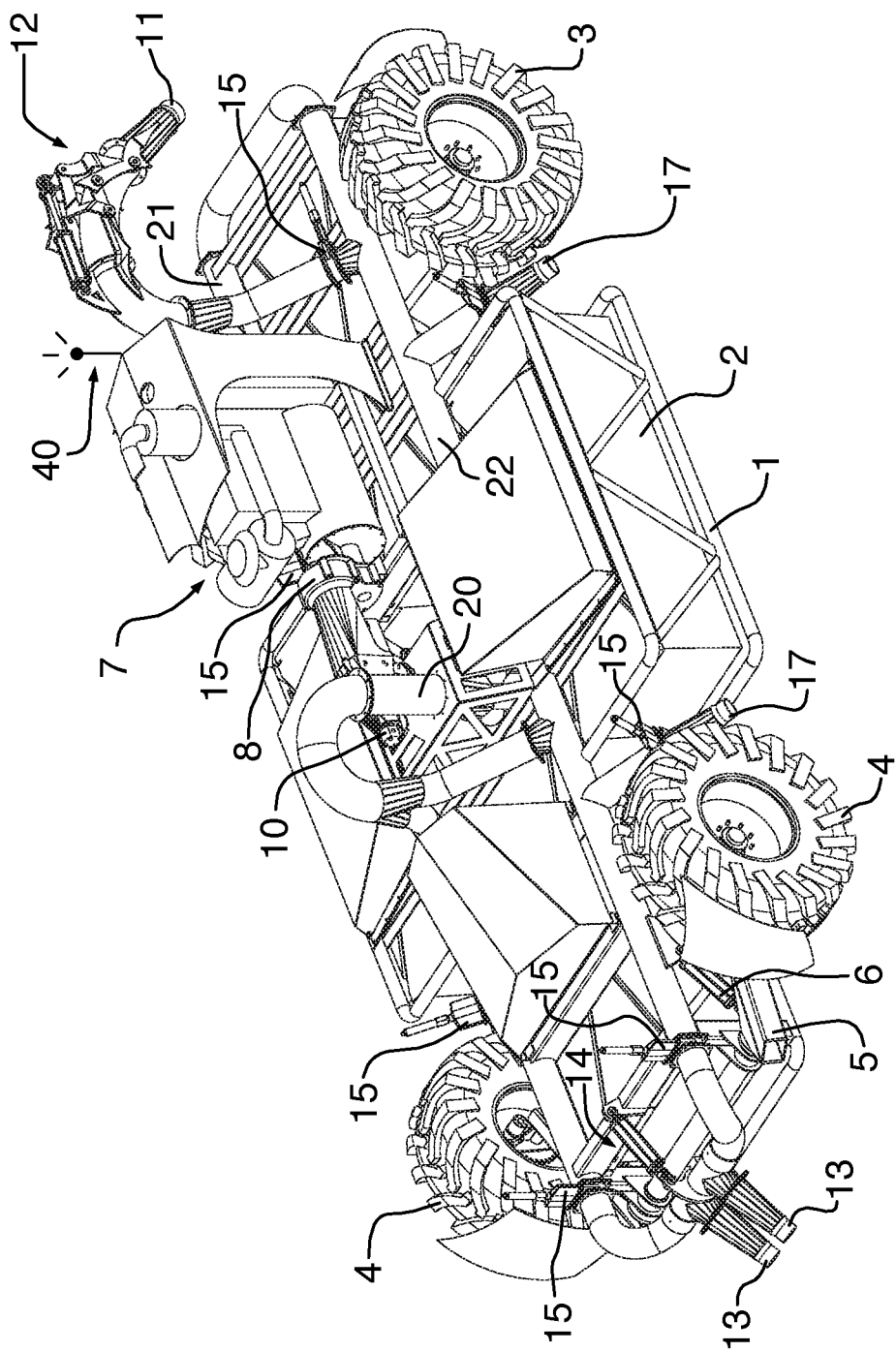
FIG. 2 shows another perspective view of the vehicle with wheels raised.
Figure 3:
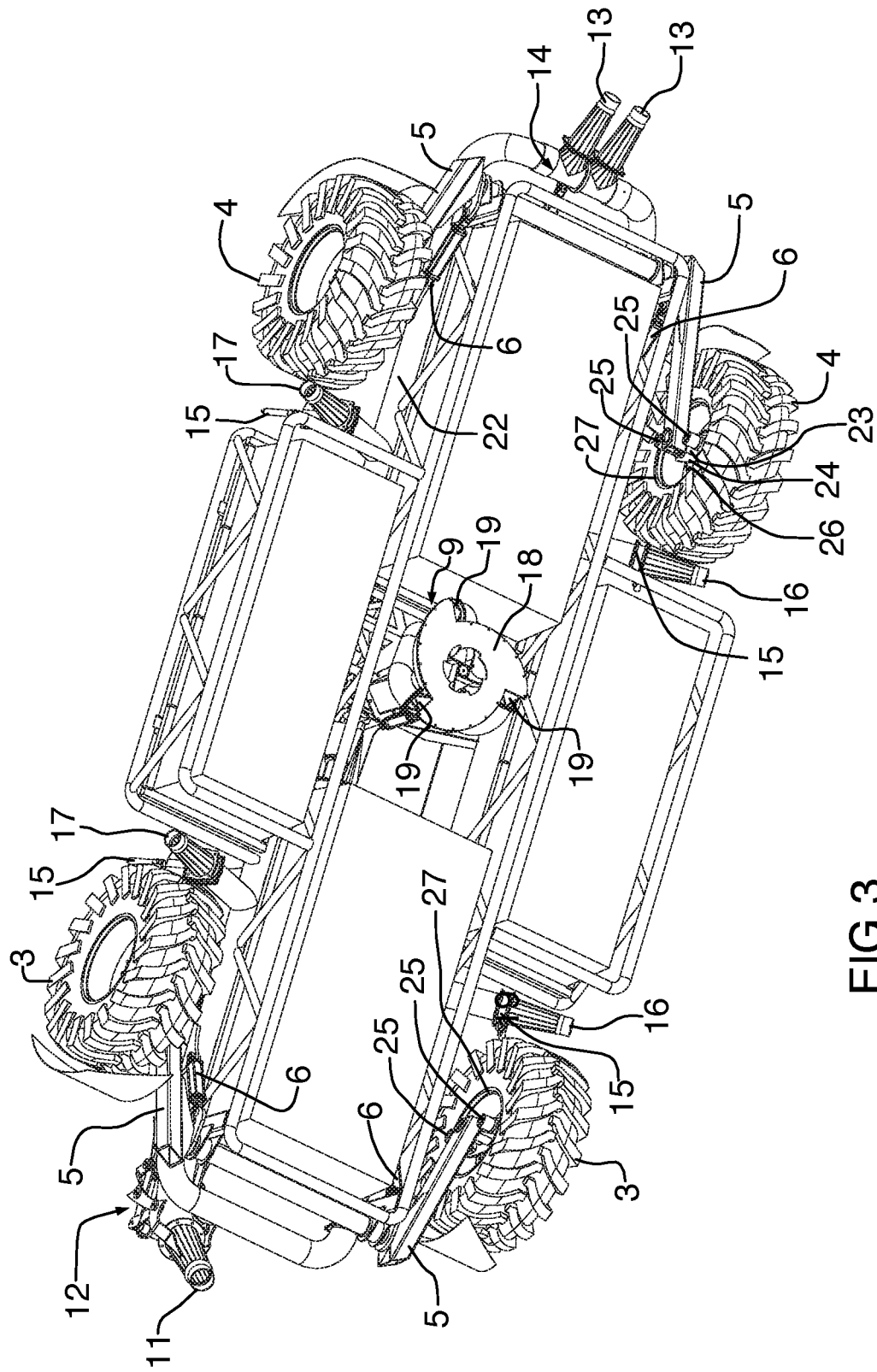
FIG. 3 shows a perspective view of the underside of the vehicle.

Referring to FIGS. 1-3, an amphibious vehicle comprises a vehicle body 1 incorporating buoyant elements 2. The buoyant elements comprise flotation tanks of the type that may be foam filled and used, for example, in the construction of floating docks. The vehicle comprises a ground engaging propulsion structure comprising two sets of wheels 3, 4. Each wheel is rotatably mounted to lever structure 5 that is pivotally attached to the vehicle body. Each lever structure 5 is driven by a hydraulic actuator 6 that is operable to cause raising and lowering of the wheels 3, 4 by pivoting of the lever structure 5. A power source 7 comprising an internal combustion engine, for example a diesel engine, is mounted to the vehicle body. A mechanical drive 8 connects the power source 7 to the fluid pump 9 and a hydraulic pump 10 that is used to provide hydraulic system fluid pressure for the vehicle.

The fluid pump 9 comprises a pump housing 18 with three tangential fluid outlets 19 that are combined into a single fluid conduit 20. The single fluid conduit 20 is then split into left side 21 and right side 22 fluid conduits which connect at the front and rear of the vehicle to form a complete circuit. The fluid pump 9 is thus fluidically connected to all fluid nozzles of the vehicle via the fluid conduits 20-22.

A first fluid nozzle 11 is provided at a front of the vehicle. The first fluid nozzle 11 comprises first articulation means 12 that is hydraulically powered to cause the nozzle to change angular orientation relative to the vehicle body 1 in a vertical plane. A pair of second fluid nozzles 13 is provided at a rear of the vehicle. The second fluid nozzles 13 comprise a second articulation means 14 that is hydraulically powered to cause the nozzles to change angular orientation relative to the vehicle body 1 in a vertical plane. The first and second fluid nozzles are part of a plurality of fluid nozzles of the vehicle. The plurality of fluid nozzles further comprises side fluid nozzles 16, 17 on opposite sides of the vehicle. A pair of left side fluid nozzles 16 and a pair of right side fluid nozzles 17 are provided.

Valve structure comprising a valve 15 corresponding to each fluid nozzle 11, 13, 16, 17 is also provided. The valves 15 are powered and operable to open or close. The valves 15 may be opened fully or partially to proportion flow between the plurality of fluid nozzles. Cooperation between the valves 15 and the plurality of fluid nozzles is used to provide directional control and motive power for the vehicle while floating. For example, proportioning fluid flow from the right side fluid nozzles 17 to the left side fluid nozzles 16 causes the vehicle to turn to the right will floating. Similarly, fluid flow may be proportioned between the first fluid nozzle 11 and the second fluid nozzles 13 to cause the vehicle to move forward or backward. By rotating the second fluid nozzles 13 fully downwardly and then up toward the front of the vehicle using the second articulation means 14, the vehicle may also be directed rearward and/or slowed in its forward movement speed. Thus, the combination of proportioning flow between the plurality of fluid nozzles using the valve structure and/or articulating the nozzles may be used to control forward, rearward, left and right movement and speed of the vehicle. The flow rate of the fluid pump 9 may also be adjusted to enhance directional and speed control via the plurality of nozzles while floating.

Figure 4:
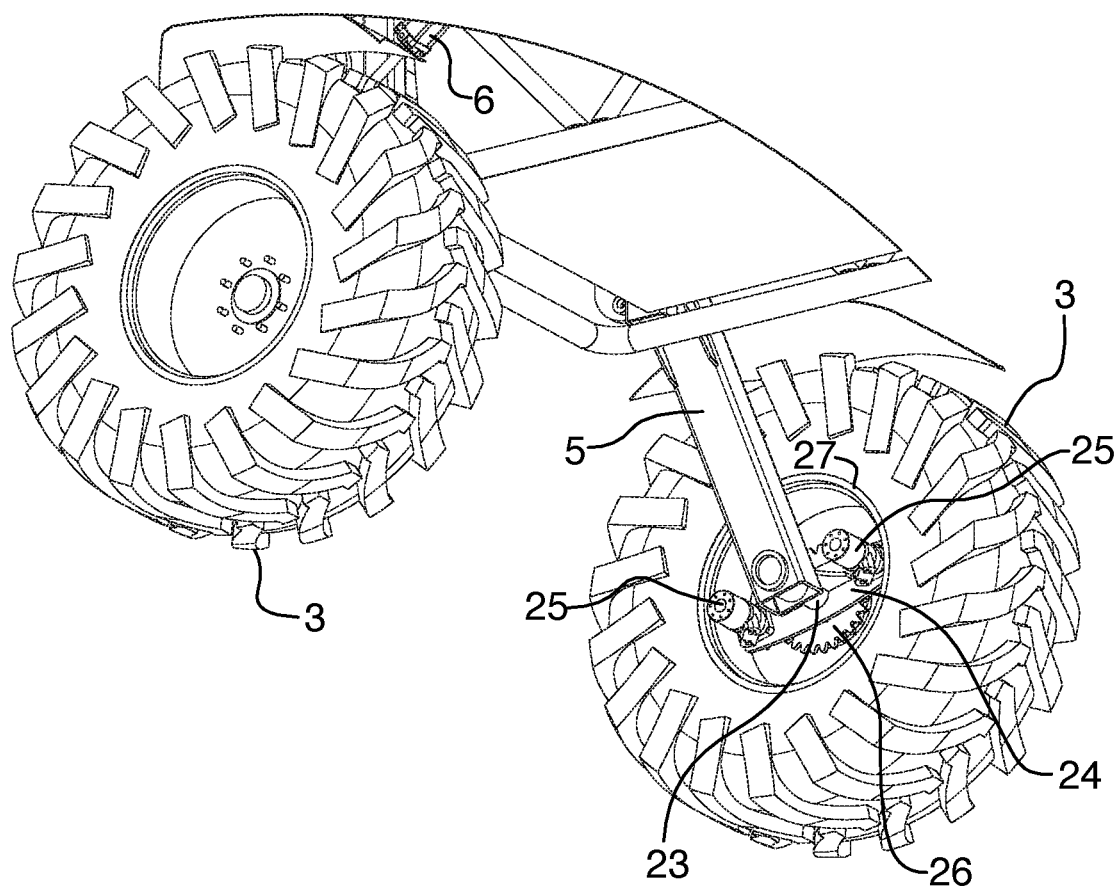
FIG. 4 shows a perspective view of a set of wheels of the vehicle from the underside of the vehicle.

Referring additionally to FIG. 4, each wheel of the front set of wheels 3 is rotatably attached to its corresponding lever 5 by a spindle 23. Fixedly mounted to lever 5 is a bracket 24 supporting a pair of hydraulic motors 25. Each hydraulic motor 25 has an output gear (not shown) that is engaged with a drive gear 26. The drive gear 26 is fixedly attached to a rim 27 of each wheel 3 concentric with the spindle 23. Referring to the right side wheel of the set of wheels 3 (showing an interior of the rim 27), operation of the hydraulic motors 25 in a clockwise direction causes the drive gear 26 to rotate in a counterclockwise direction, moving the vehicle forward. Reversing the direction of operation of the hydraulic motors 25 causes the vehicle to move rearward. By increasing the rotational speed of the hydraulic motors 25 on the right side relative to the motors 25 on the left side, the vehicle is caused to turn to the left. The motors 25 connected to the rear set of wheels 4 work in a similar manner to those described for the front set of wheels 3. Thus, directional and motive control of the vehicle (forward/reverse) while on land is controlled by varying the relative speed and rotational direction of the hydraulic motors 25.

Figure 5:
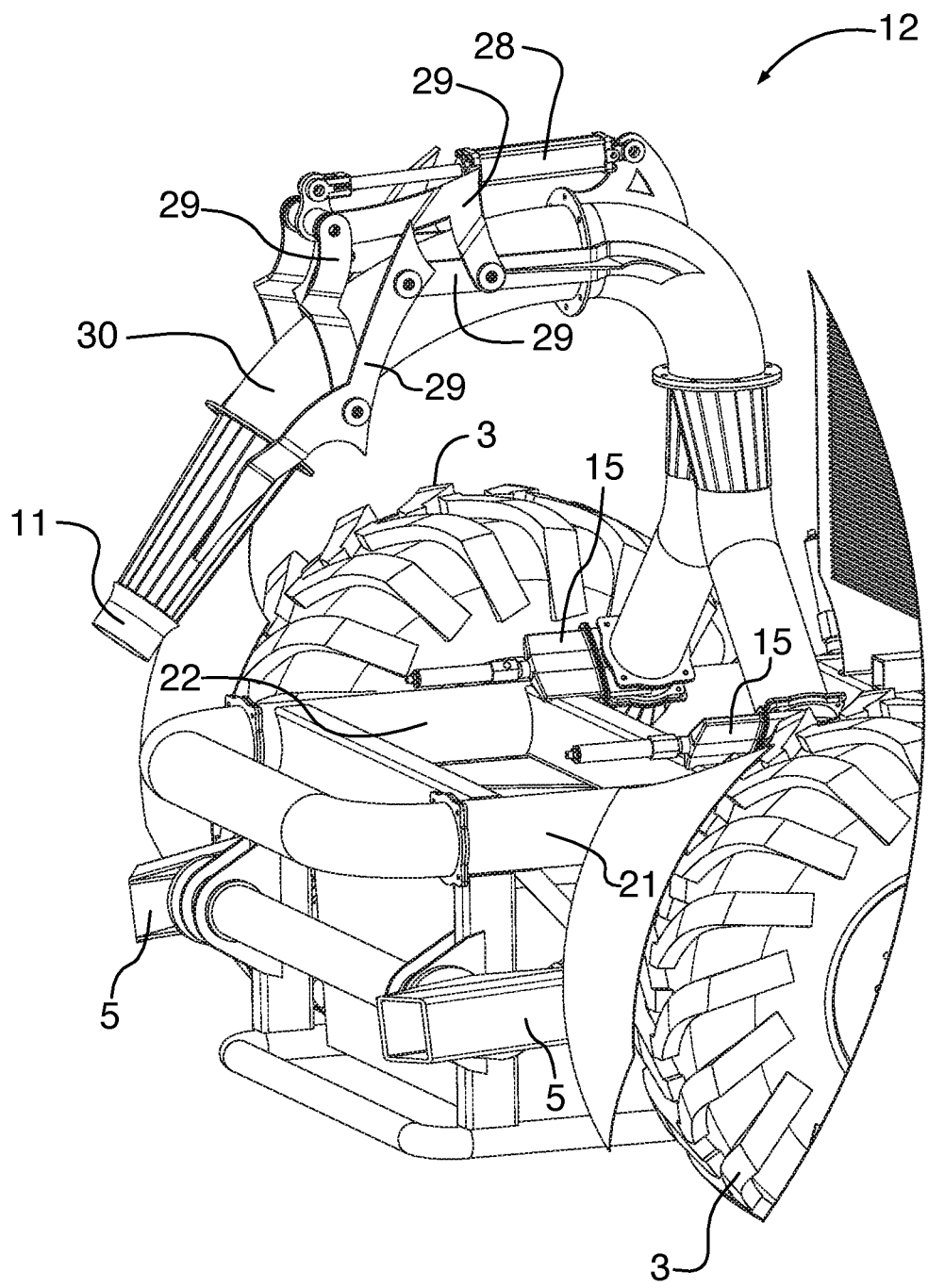
FIG. 5 shows a perspective view of the first fluid nozzle of vehicle.

Turning now to FIG. 5, the first fluid nozzle 11 is able to change angular direction in a vertical plane relative to the vehicle body 1 through operation of a powered first articulation means 12. The first articulation means 12 comprises a hydraulic first articulation cylinder 28 that is coupled to a four bar linkage 29. The four bar linkage serves to amplify the effective stroke length of the first articulation cylinder 28 to cause the nozzle to move through a larger degree of motion in the vertical plane than if the linkage 29 were not present. The first fluid nozzle 11 is connected to the fluid conduits 21, 22 via a flexible conduit 30 that permits articulation of the nozzle. Valves 15 are provided to proportion flow to the first fluid nozzle in a manner as described previously.

Figure 6:
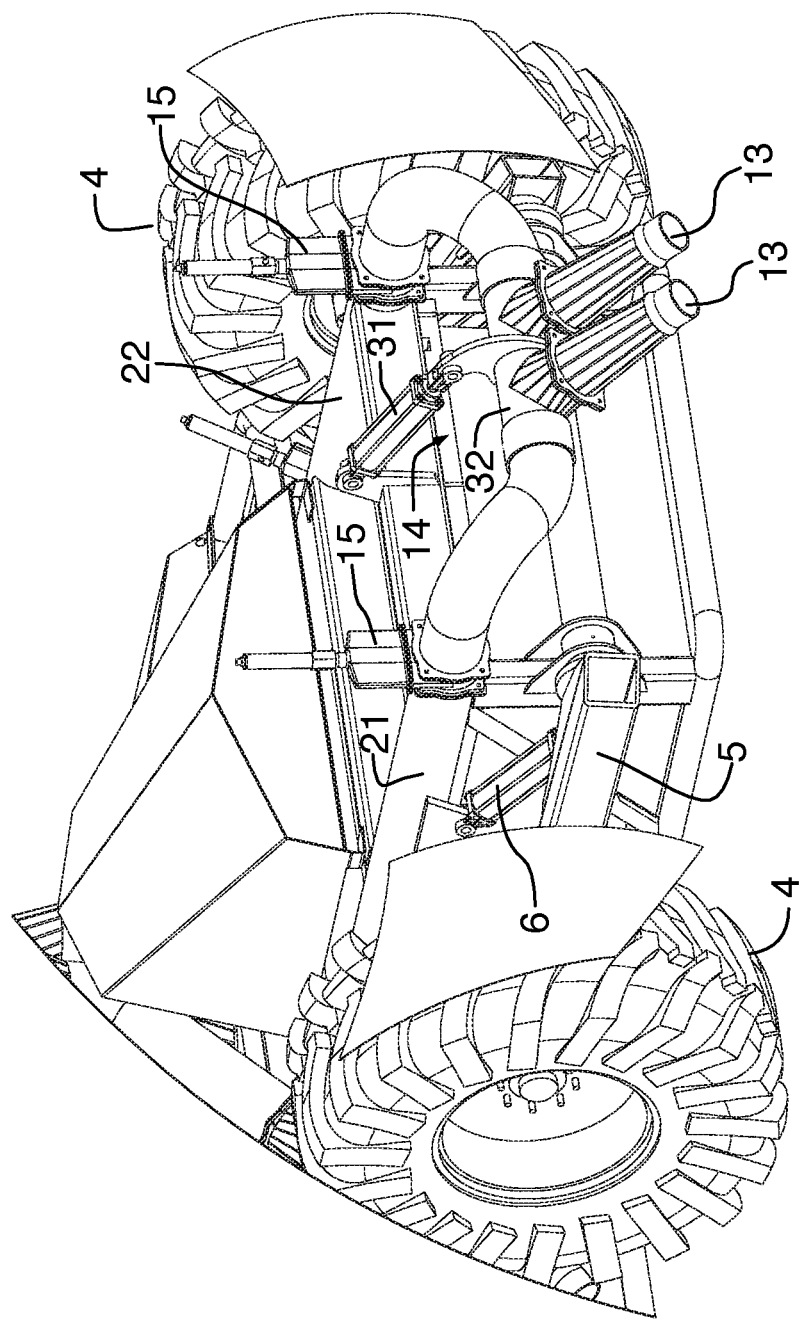
FIG. 6 shows a perspective view of a second fluid nozzle of the vehicle.

Referring to FIG. 6, the second fluid nozzles 13 are connected to the fluid conduits 21, 22 by articulation means 14 that comprises a hydraulic second articulation cylinder 31 mounted to the vehicle body 1 and connected to a rotatable conduit section 32. Actuation of the second articulation cylinder 31 causes the rotatable conduit section 32 to rotate relative to the first and second fluid conduits 21, 22. The second fluid nozzles 13 are provided on rotatable conduit section 32 and thus rotate with the conduit section 32 upon actuation of the articulation cylinder 31. This causes the nozzles 13 to change angular orientation relative to the vehicle body 1 in a vertical plane. The geometry of the second articulation cylinder 31 and the rotatable conduit section 32 is such that the nozzles 13 may be rotated fully downwardly and then upwardly towards the front of the vehicle. This allows an operator to change the amount of forward movement to slow or even reverse forward movement of the vehicle. When operated in conjunction with the valves 15, the nozzles 13 and second articulation structure 14 provide a high degree of control over forward and reverse movement of the vehicle.

Figure 7:
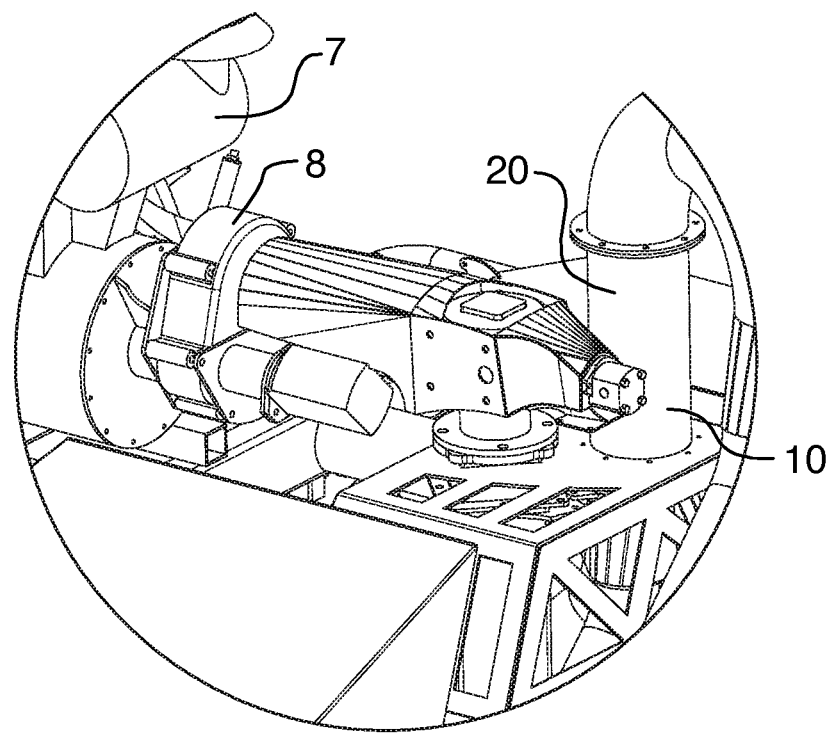
FIG. 7 shows a perspective view of a mechanical drive connecting the power source of the vehicle to the fluid pump and a hydraulic pump of the vehicle.

Referring to FIG. 7, the power source 7 comprises an internal combustion engine connected to a mechanical drive 8 that delivers power to the pump 9 (not shown in FIG. 7) and also to the hydraulic pump 10 that is used to provide hydraulic fluid pressure to the vehicle's hydraulic systems. A transmission is provided within the mechanical drive 8 that allows the rotational speed of the fluid pump 9 to be adjusted independently of the rotational speed of the hydraulic pump 10. The power source 7 is thus mechanically connected to both the fluid pump 9 and the hydraulic pump 10.

Figure 8:
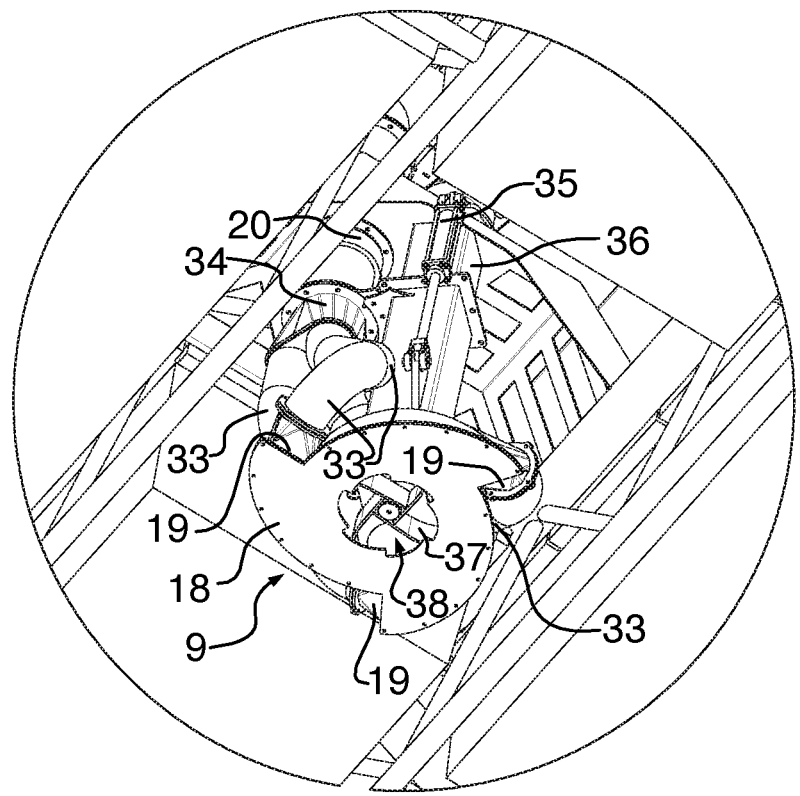
FIG. 8 shows a perspective view of the fluid pump from the underside of the vehicle.

Referring to FIG. 8, the fluid pump 9 comprises a pump housing 18 comprising three tangential fluid outlets 19 that are connected via flexible pump outlet conduits 33 to a combiner 34 that is used to combine the fluid output of the tangential fluid outlets 19 into the single conduit 20. A pump actuation cylinder 35 is provided to cause raising and lowering of the pump 9 and especially the pump housing 18 relative to the vehicle body 1. A telescoping pump support structure 36 is provided for use in combination with the pump actuation cylinder 35. A mechanical drive shaft (not shown) runs through the telescoping pump support structure 36 to provide power to the pump impeller 37. When powered, the impeller 37 draws the fluid to be pumped through an enlarged bottom fluid opening 38 of the pump housing 18. By immersing the pump housing 18 in the fluid, fluid is allowed to enter the pump housing, thereby obviating the need for priming the pump. Raising the pump 9 via the pump actuation cylinder 35 and telescoping pump support structure 36 allows the vehicle to exit the lagoon (or similar fluid reservoir) without damaging the pump. Thus, these structures cooperate with the ground engaging propulsion structure to allow the vehicle to operate on land.

An example of a pump 9 suitable for use with the vehicle is disclosed in co-pending U.S. patent application Ser. No. 13/038,189 filed Mar. 1, 2011, entitled Pump for Immersion Within a Fluid Reservoir, which is incorporated herein by reference.

The location of at least the ground engaging propulsion structure, the power source and the fluid pump are selected to provide a desired location for a center of gravity of the vehicle. The desired location for the center of gravity of the vehicle is selected to improve handling characteristics of the vehicle while floating. The center of gravity is located along the longitudinal centerline of the vehicle, substantially in the middle of the vehicle.

A remote control structure 40 comprises an antenna configured to cause the vehicle to be remotely controllable by an operator remote from the vehicle. The remote control structure comprises a wireless transmitter used by the operator and a wireless receiver on the vehicle. The wireless receiver interfaces with a hydraulic control center on the vehicle to permit control of hydraulically operated components, such as hydraulic cylinders, valves, motors, etc. This allows the operator to control vehicle speed and direction on land or when floating, to raise the wheels and to change the angular orientation of the first and second fluid nozzles. A wireless engine starter is provided to control operation of the internal combustion engine used as a power source. A set of hydraulic controls is optionally provided to modulate engine speed and/or fluid pump rotational speed. Thus, a variety of functions may be controlled remotely that allow the vehicle to operate on land or when floating.

In operation, an operator uses the remote controls to maneuver the vehicle to the lagoon entrance, drive the vehicle into the lagoon, raise the ground engaging propulsion structure (wheels), lower the fluid pump, begin pumping fluid with the fluid pump through the fluid conduits and selectively open at least the second fluid nozzles to cause the vehicle to move out on to the surface of the lagoon. The valves associated with the side fluid nozzles may also be opened or closed to provide directional control of the vehicle on the lagoon. Once the vehicle is in the desired position, the valves associated with the first fluid nozzle are opened and the first articulation structure is used to position the first fluid nozzle at a desired angular orientation relative to the vehicle body. This is generally an upward orientation so that the fluid is sprayed widely to break crusts of material floating on the surface of the lagoon. In this manner, fluid is recirculated and directed to desired locations in the lagoon. As fluid is emptied from the lagoon, the floating vehicle is permitted to lower with the fluid level. When the lagoon has been sufficiently emptied, the operator is able to reverse the foregoing process in order to maneuver the vehicle to the lagoon exit, lower the wheels, and drive the vehicle up the muddy bank out of the lagoon.

The novel features will become apparent to those of skill in the art upon examination of the description. It should be understood, however, that the scope of the claims should not be limited by the embodiments, but are intended by the inventor to be given the broadest interpretation consistent with the wording of the claims and the specification as a whole.

The invention claimed is:

1. An amphibious pumping vehicle comprising:
a floatable vehicle body;
ground engaging propulsion structure;
a fluid pump for pumping liquid manure;
a plurality of fluid nozzles comprising a first fluid nozzle and at least one second fluid nozzle connected by a fluid conduit to the fluid pump;
a power source configured to provide power to both the ground engaging propulsion structure and the fluid pump; and,
remote control structure configured to control the ground engaging propulsion structure and a flow of fluid from the plurality of fluid nozzles such that the vehicle is remotely controllable by an operator remote from the vehicle when the vehicle is ground engaging and when the vehicle is floating.

2. The vehicle according to claim 1, wherein the ground engaging propulsion structure comprises a set of wheels or an endless track.

3. The vehicle according to claim 2, wherein the set of wheels comprises at least two powered wheels.

4. The vehicle according to claim 1, wherein the power source is connected to a hydraulic pump that is configured to provide hydraulic fluid-power to the ground engaging propulsion structure.

5. The vehicle according to claim 4, wherein the hydraulic pump is configured to provide hydraulic fluid power to both the ground engaging propulsion structure and the fluid pump.

6. The vehicle according to claim 4, wherein the ground engaging propulsion structure is operable at variable speed by a remotely controllable hydraulic motor.

7. The vehicle according to claim 4, wherein the power source is connected to the hydraulic pump by a mechanical drive and connected to the fluid pump by the mechanical drive.

8. The vehicle according to claim 1, wherein the ground engaging propulsion structure is able to raise and lower relative to the floatable vehicle body.

9. The vehicle according to claim 1, wherein the vehicle further comprises remotely actuatable valve structure in the fluid conduit configured to proportion fluid flow between the plurality of fluid nozzles.

10. The vehicle according to claim 9, wherein the plurality of fluid nozzles comprises at least two side fluid nozzles on opposite sides of the vehicle connected to the fluid conduit.

11. The vehicle according to claim 10, wherein the plurality of fluid nozzles and the valve structure co-operate to provide directional control and motive power for the vehicle when floating.

12. The vehicle according to claim 1, wherein at least the first fluid nozzle comprises first adjustment structure that is powered and configured to adjust an angle of the first fluid nozzle relative to the floatable vehicle body and wherein the remote control structure is configured to control an angular orientation of at least the first fluid nozzle.

13. The vehicle according to claim 1, wherein the at least one second fluid nozzle comprises second adjustment structure that is powered and configured to adjust an angle of the at least one second fluid nozzle relative to the floatable vehicle body by an amount sufficient to cause forward or backward movement of the vehicle when floating and wherein the remote control structure is configured to control an angular orientation of the at least one second fluid nozzle.

14. The vehicle according to claim 1, wherein the location of the ground engaging propulsion structure, power source and fluid pump are selected to provide a desired location for a center of gravity of the vehicle.

15. The vehicle according to claim 1, wherein the remote control structure is configured so that the operator remote from the vehicle can control speed and direction of the vehicle when the vehicle is ground engaging and when the vehicle is floating.

16. The vehicle according to claim 15, wherein the remote control structure is configured so that the operator remote from the vehicle can control the amount of fluid flow from the first nozzle and the direction of the first nozzle when the vehicle is floating.

17. The vehicle according to claim 6, wherein the ground engaging propulsion structure comprises a plurality of wheels that are independently driven at variable speeds by remotely controllable hydraulic motors connected to each wheel.

18. The vehicle according to claim 9, wherein the remotely actuatable valve structure comprises a plurality of valves, each valve of the plurality of valves corresponding to one of the fluid nozzles of the plurality of fluid nozzles, and wherein the remote control structure is configured so that the operator remote from the vehicle can remotely actuate each valve of the plurality of valves.

19. The vehicle according to claim 1, wherein the remote control structure is configured so that the operator remote from the vehicle can remotely control rotational speed of the fluid pump.

20. The vehicle according to claim 1, wherein the remote control structure comprises an antenna, a wireless transmitter used by the operator and a wireless receiver on the vehicle.

* * * * *

UNITED STATES PATENT AND TRADEMARK OFFICE
CERTIFICATE OF CORRECTION

PATENT NO. : 10,710,422 B2
APPLICATION NO. : 16/157950
DATED : July 14, 2020
INVENTOR(S) : Ian Nuhn Page 1 of 1

It is certified that error appears in the above-identified patent and that said Letters Patent is hereby corrected as shown below:

In the Specification

At Column 1, Lines 11-12 replace the date "Aug. 19, 2014" with the date "Aug. 18, 2014" for international patent application PCT/CA2014/050789

Signed and Sealed this
Twenty-fourth Day of September, 2024

Katherine Kelly Vidal
*Director of the United States Patent and Trademark Office*